United States Patent [19]

Junge et al.

[11] Patent Number: 4,905,220

[45] Date of Patent: Feb. 27, 1990

[54] CIRCUIT FOR A CENTRAL CONTROL TIME DIVISION MULTIPLEX PCM TELECOMMUNICATIONS SYSTEM

[75] Inventors: Uwe Junge, Munich; Helmut Seeger, Wolfratshausen; Anthony Maher, Munich; Axel Leichum, Munich, all of Fed. Rep. of Germany

[73] Assignee: Siemens Aktiengesellschaft, Berlin and Munich, Fed. Rep. of Germany

[21] Appl. No.: 69,470

[22] Filed: Jul. 2, 1987

[30] Foreign Application Priority Data

Jul. 3, 1986 [DE] Fed. Rep. of Germany ....... 3622369

[51] Int. Cl.$^4$ ...................... H04M 3/08; H04Q 11/04
[52] U.S. Cl. ..................................... 370/16; 379/269; 379/279
[58] Field of Search ...................... 370/16; 379/279, 2, 379/269

[56] References Cited

U.S. PATENT DOCUMENTS

| | | | |
|---|---|---|---|
| 4,059,736 | 11/1977 | Perucca et al. | 370/16 |
| 4,144,407 | 3/1979 | Zaffignani et al. | 370/16 X |
| 4,543,651 | 9/1985 | Chang | 370/16 |

OTHER PUBLICATIONS

Telcom Report (Siemens, Munich), vol. 4, (1981), Special Issue "FWSD Digital Switching System" pp. 3–67.

Primary Examiner—Thomas W. Brown
Attorney, Agent, or Firm—Jeffrey P. Morris

[57] ABSTRACT

A circuit for a central control TDM PCM telecommunications exchange with groups of terminals connected to a switching network is disclosed in which the terminal groups which are each connected to the duplicated switching network over TDM lines and which each include a subsidiary switching network and a decentral control unit are assigned to one another in pairs. In preparation for the stand-by substitution of the central switching network and associated central processor, in the two terminal groups, assigned to one another in pairs, the subscriber lines and/or connection lines connected to the first of said terminal groups can be switched-over from the subsidiary switching network of the first terminal group to the subsidiary switching network of the partner terminal group, whereupon the decentral control unit additionally undertakes all the control functions for the decentral control unit of the first terminal group. The decentral control units of all the first of the two terminal groups, assigned to one another in pairs, are connected over the switching network, which commences operation for the imminent stand-by connection, to the corresponding central processor by which they are loaded with all the required software. The switching operation is continued using the respective second decentral control unit until the loading procedures have been completed and the stand-by substitution of the central switching network and central processor has taken place and the temporary switch-over of the subscriber lines and/or connection lines within each of the pairs of terminal groups is cancelled.

4 Claims, 2 Drawing Sheets

CIRCUIT FOR A CENTRAL CONTROL TIME DIVISION MULTIPLEX PCM TELECOMMUNICATIONS SYSTEM

CROSS REFERENCE TO RELATED APPLICATION

Gerhard Schaich, et al., Ser. No. 016,434 filed Feb. 19, 1987, now U.S. Pat. No. 4,763,316; Circuit Arrangement For Centrally Controlled Time Division Multiplex Telecommunication Exchange Facilities; assigned to the same assignee as the present application.

BACKGROUND OF THE INVENTION

1. Field of the Invention

The invention relates generally to a circuit for central controlled telecommunications exchange systems, and specifically to PCM time division multiplex (TDM) telephone exchange systems, in which a central switching network, which serves to switch through the connections, together with a program-controlled central processor, one of the functions of which is to control the switching network and to process switching information, is provided in duplicate as a stand-by operating facility. A plurality of decentralized groups of terminals are each equipped with a subsidiary switching network for the external connection of connection lines and/or subscriber lines, and with a decentralized, programmable control device which functions to receive switching information from these lines, to preliminarily process the switching information and forward it to the central processor, and to transmit switching information to these lines. In each of the groups of terminals, the respective subsidiary switching network is internally connected via two groups of link lines which are divided up in groups, to switching network terminals of the first of the two parallel switching networks and to the other thereof for a data exchange, for the purpose of handling of switching information and for the transmission of program software and switching software between the decentralized control devices and the respective processor which is ready for operation or is preparing for operation. Each decentralized control device data connection from the processor via the assigned switching network to the decentralized control devices is brought into or maintained in the ready-for-operation state. An input-output device is provided which is connected to the central processor and which is permanently connected by a plurality of link terminals, provided for each data connection, to switching network terminals individually in the manner of the link lines.

2. Description of the Prior Art

A known prior art circuit is described in the magazine "Telcom Report" supplement 1981, pages 7 ff, 19 ff and 49 ff which illustrates and describes the subsidiary switching networks of the peripheral terminal groups (LIU). Internally they are connected to the duplicated central switching network and externally they are connected via terminal units (LTU/DIU) to analog lines and analog channels of digital transmission systems. Except where they serve as subscriber lines or channels provided for subscriber terminals, these lines and channels lead to other exchanges and can be seized in known manner for the establishment of individual connections.

The control channels which are permanently switched through into the ready-for-operation state via the duplicating switching network are described in page 8. Therefore, for reasons of security, the central switching network and central processor are provided in duplicate. This duplication is not of particular significance as regards the totality of such an exchange as it relates to only a few central components. Thus the peripheral terminal groups and the assigned components, such as the decentral control unit and subsidiary switching network, which are provided in larger numbers and consequently on a comparatively larger scale, are not provided in duplicate. In the event of the breakdown of a terminal group (for example of its subsidiary switching network or its decentral control device or its current supply), such a relatively small part of the total number of connected subscriber lines and connection lines is affected that a temporary interruption in operation, which is limited to these lines can be accepted.

The control channels consist of the aforementioned data connections which must be provided for the data exchange which serves to process incoming information in the terminal groups, in the central processor and to transmit program software and switching software from the central processor to the decentral control units, and which is carried out between the decentral control devices and the central processor and which for this purpose are brought or permanently maintained in the ready-for-operation state. In the aforementioned Telecom Report, page 25 it is described that at the start of the switching operation, the decentral control devices are loaded with programs and permanently stored data from the central processor via the control channels. Such loading procedures are carried out for each of the decentral control devices. The loading procedures are carried out not only at the start of the switching operation but also for the purpose of stand-by operation. Thus when the switching operation which is employing one of the two parallel switching networks and one of the two central processors, i.e. the central processor assigned to the respective central switching network, is continued not using this central switching network and this central processor, it uses the respective other central switching network and the respective other central processor.

Stand-by operation is required when faults occur, and thus generally unforseeably. Faults can be sufficiently serious to necessitate immediate stand-by operation. Frequently, however, such faults affect only parts of the common exchange for example only a part of the central switching network or only specific functions in the central switching network or in the central processor or else they may occur sporadically. In such cases, i.e. in most cases where there is a need for stand-by operation, the stand-by operation measure can also be temporarily postponed. As the above-described loading procedures associated with stand-by operation involve large quantities of data and must be carried out in respect of each decentral control device, they are relatively time consuming. The loading procedures must be completed before the switching operation itself can be commenced. Stand-by operation measures often result in a disadvantageously long interruption in operation.

Therefore, the object of the present invention is to provide improved operating conditions for stand-by measures and to avoid long interruptions in operation.

SUMMARY OF THE INVENTION

The present invention provides two groups of terminals that are assigned to one another in pairs. Each pair may be terminal units, subscriber terminal circuits, multiple subscriber terminal circuits, connection line (multiple) terminating circuits and the like, which function to externally connect subscriber and/or connection lines. A group of terminals in normal operation are connected to the subsidiary switching network and can in part be switched-over in the case of stand-by operation. As a result of the stand-by operation, the terminal units of a first of these two terminal groups are also connected to the subsidiary switching network of the other terminal group, and for the connections leading across the switched-over terminal units, the corresponding handling of switching information and the setting-up of the subsidiary switching network is similarly carried out by the decentral control device of the second terminal group, which constitutes the stand-by substitution of one of the two central processors by the other of the two processors is prepared for. The first processor initially continues its operation and all the terminal groups, assigned to one another in pairs, are converted from normal operation to stand-by operation. The other central processor brings into the ready-for-operation state data connections via the assigned central switching network to the decentral control devices of all the first terminal groups, and then consecutively supplies for storage to the decentral control devices the program software and switching software, required for the start of their operation.

The invention substantially reduces the duration of the complete interruption in operation resulting from the stand-by connection of the central processor and the central switching network, while continuing the switching operation with a reduced traffic load with respect to capacity of the connection functions.

BRIEF DESCRIPTION OF THE DRAWINGS

FIG. 1 shows a circuit according to the invention which is part of a telephone exchange system of the type described in the U.S. Pat. No. 4,499,461.

FIG. 2 shows a system in accordance with the present invention.

DESCRIPTION OF THE PREFERRED EMBODIMENT

Modern telephone exchanges in which the present invention is employed are Time Division Multiplex (TDM) systems employing PCM technology. Such known systems are described in detail in the technical literature, such as in "Telcom Report", wherein on page 19 ff, peripheral groups of terminals in a telephone exchange are described. Similarly, as shown in FIG. 1, page 8 of the Telcom Report, the switching network (SN) and central processor (CP) are provided in duplicate, and are referenced herein as central switching networks "K1" and "K2" and central processors "ZW1" and "ZW2" respectively in FIG. 1.

Figure 1:
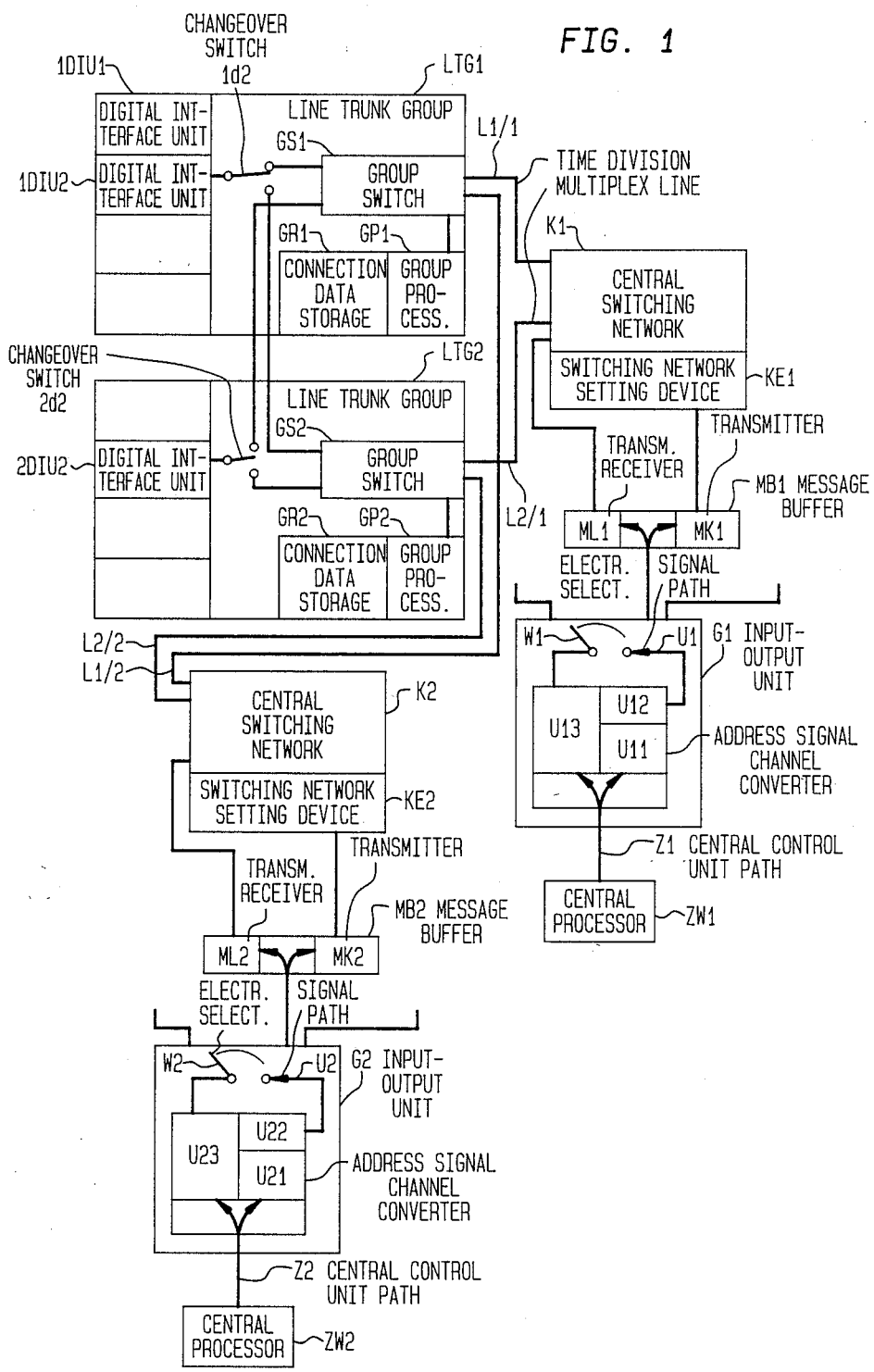
FIGS. 1 and 2 are simplified blocks diagrams illustrating those elements which are illustrative of the invention.

The drawings show two groups of terminals (indicated as line trunk groups) LTG1 and LTG2 which form part of a centrally controlled TDM telephone exchange system designed in PCM technology in accordance with FIG. 1. In a known manner, they are connected via TDM lines L1/1, L2/1, L1/2 and L2/2 to the multi-stage central, duplicated switching network K1/K2 of FIG. 1, which is provided with TDM inputs and TDM outputs. In accordance with this duplication of the switching network, each of the terminals represents a duplicate. Each of the two TDM lines provided for each group of terminals, for example, LTG1, comprises a large number, such as thirty channels, for each of the two transmission directions and accordingly, and as described in detail in the aforementioned U.S. Pat. No. 4,499,461 issued Feb. 12, 1985, is connected both to a TDM input and to a TDM output of each of these two switching networks.

Also, in accordance with FIG. 1, for each of the two parallel switching networks K1/K2 a central processor ZW1 and ZW2 respectively is provided, which enable all the control procedures required for establishing connections via the respective central switching network K1 or K2, which are performed in a known manner by means of a message buffer device MB1/MK1 and MB2/MK2 respectively and by means of a switching network setting-up device KE1 and KE2 respectively, the operation of which are described in detail in the aforementioned German Patent. Information is obtained by the central processors ZW1 and ZW2 respectively from the terminal groups, e.g. LTG1, etc., and, in the reverse direction, information is transferred thereto. Decentral control devices (indicated as group processors) GP1, GP2 and other devices of a similar nature in the terminal groups cooperate in this operation in a known manner. For this exchange of information, the terminal groups and the terminal units contained therein are driven in addressed fashion.

Of the two central switching networks K1 and K2 and the two central processors, at any one time one switching network, for example K1, and one central processor, for example ZW1, is in operation while the other switching network and the other processor remain available for stand-by operation. For simplicity of description, only the central switching network K1 and the central processor ZW1 will be referred to.

The information to be transmitted from the central processor SW1 to the aforesaid terminal groups, can also represent call-up commands which call up items of information, for example items of dialing information, to be transferred from the terminal groups or the terminal units to the central control unit. The information is preceded by an address which designates the respective terminal unit. If a terminal unit is now to be driven by the central processor ZW1 for the transfer of an item of information (such as a call-up command) from the processor to the terminal unit, the central processor initially transfers the address and the information successively to an input-output device G1 ("Telcom Report": IOP) by which they are initially received and stored.

As described in the German Patent, data connections exist between the input-output devices G1 and each of the terminal groups, i.e. their decentral control devices, such as GP1, GP2 via the TDM lines L1/1 and L2/1, and via one channel in respect of each TDM line, and via the switching network K1 and via buffer devices MB1/ML1. If the input-output device G1 has now received an item of information and address from the central control unit ZW1 via the path z1, of the address, it transfers a first address section to an address signal channel converter U11/U12. The first address section corresponds to the respective terminal group and thus to the assigned data connection via the buffer device MB1 and the switching network K1. The aforementioned converter U11/U12 emits an item of control information which corresponds to the first address section and which it transfers via the control path u1 to an electronic selector W1 which is thus set up for the respective signal channel (extending via MB1). The input-output device G1 is connected via MB1 to the decentral control device, for example GP1, of the respective terminal group such as LTG1, which it supplies with the information together with the full address, i.e. including the first address section.

A large number of terminal groups are provided, which function to connect TDM connection lines assigned to various traffic directions, of which the two terminal groups LTG1 and LTG2 are shown by way of an example. The significance, functions and operation of these terminal groups are described in detail in the aforementioned publication.

As also described in the aforementioned publication, each of the terminal groups contains a plurality of terminal units which function in a known manner to connect subscriber lines, connection lines, or transmission systems to channels which can be seized for individual connections. Various types of terminal units exist, for example those for analog subscriber lines, those with digital subscriber lines, those for analog subscriber lines, those with digital subscriber lines, those for analog connection lines and the like. Terminal units also are known with each function to connect a TDM connection line which, as is known can comprise a large number, such as twenty-four or thirty PCM-channels which can be seized for individual connections. As is also known, a pair of channels is provided for each connection, one channel being provided for the one direction of transmission and the other channel for the other direction of transmission.

The purpose for which the terminal units are used is described in detail in the aforesaid publication. In the case of analog subscriber lines and analog connection lines a terminal unit is provided for a plurality of lines. Terminal units for transmission systems which operate in accordance with TDM each comprise a large number of channel pairs, and are constructed such that a terminal unit is connected to a transmission system comprising twenty-four or thirty channel pairs. The aforementioned publication also describes a terminal group equipped with terminal units for TDM transmission systems in which a total of four or five such terminal units are provided. The publication also states that within a terminal group, terminal units are connected to a TDM switching device of the respective terminal group and via the latter to channels of the TDM input, corresponding to the respective terminal group, and the corresponding TDM output of the central switching network.

An important feature of this numerical assignment is that the traffic loads on the various sub-sections of the connection paths are matched to each other in the best manner possible. In practice, this means that the total number of channel pairs comprised by the TDM connection lines connected to the terminal units of a terminal group (PCM-transmission systems, of which each can be assigned to a different traffic direction but which can also be commonly assigned, two or several at a time, to one and the same traffic direction) is approximately equal to the number of channel pairs comprised by that TDM line which connects the respective terminal group to the central switching network. Thus the transmission systems 1u1 to 1u4 in FIG. 2 are assumed to comprise the same number of channel pairs as the TDM line L1/1.

Since TDM lines are liable to break down as a result of disturbances, which applies to the TDM lines L1/1, L1/2, L2/1, L2/2, this means that the TDM transmission systems, each connected to the terminal units of the respective terminal group, likewise would no longer be available for establishing connections. Since, in switching technology, in view of the prescribed values and data relating to the numbers of channel pairs assigned to each traffic direction, frequently only one single transmission system needs to be provided for each traffic direction, in the event of the breakdown of the TDM line which connects a terminal group to the central switching network, the respective one and only transmission system provided per traffic direction would also break down. The same principle applies to the breakdown of the decentral control device GP1, of a terminal group, such as LTG1.

Figure 2:
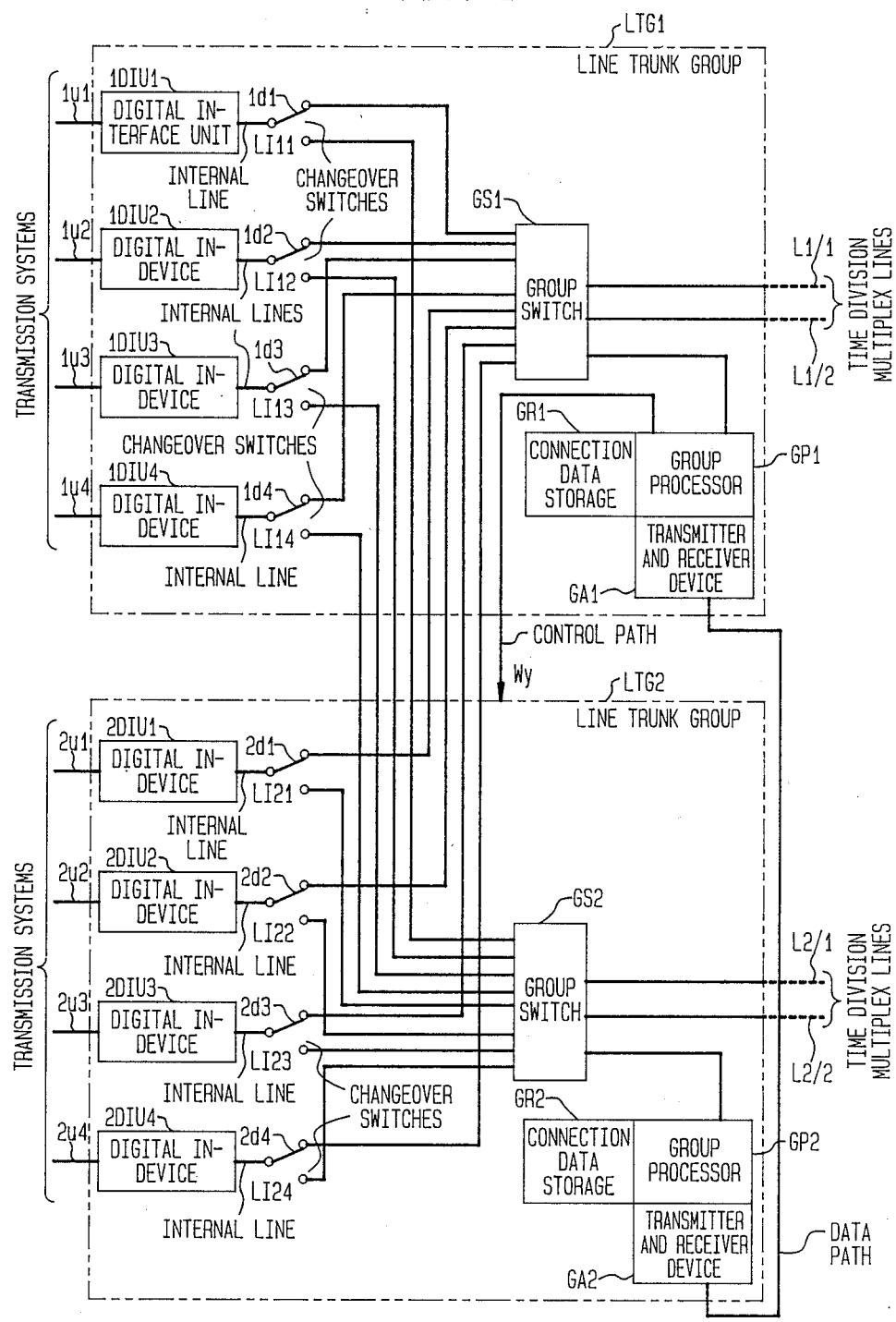

With reference to FIG. 2, the aforementioned problem is eliminated by assigning two terminal groups to one another in pairs. The principles which apply to the two terminal groups LTG1 and LTG2, also apply to all the other terminal groups and their terminal devices to which PCM-transmission systems are connected in the described way. It is also provided that the terminal devices indicated as digital interface units 1DIU1 to 1DIU4 and 2DIU1 to 2DIU4 of each of these two terminal groups LTG1 and LTG2, which in normal operation are connected to the TDM switching devices (indicated as group switches GS1 and GS2 of their own terminal group LTG1 and LTG2 respectively, in the case of the stand-by operation of one of these two terminal groups, LTG2, can be switched over to the TDM switching device, such as GS1, of the other terminal group, such as LTG1. Change-over switches 1d1 to 1d4 and 2d1 to 2d4 are provided for this purpose. In FIG. 2 they are represented in the rest position which corresponds to normal operation. In the event of a change from normal operation to stand-by operation the change-over switches are switched-over from the represented rest position into their operating position. The stand-by operation situation exists when, as a result of a fault or a disturbance, a breakdown of the above-described type occurs in a terminal group.

If, in the event of a transition from normal operation to stand-by operation due to the breakdown of the TDM line L2 as a result of a disturbance, the change-over switches 2d1 to 2d4 are switched-over from the rest position into the operating position, and from this time onward the terminal units 2DIU to 2DIU4 of the terminal group LTG2 are connected to the TDM switching device GS1 of the terminal group LTG1. As a result, in the event of the breakdown of the TDM line L2, the PCM-transmission systems 2u1 to 2u4 can continue to operate using their channel which can be seized individually with respect to each connection. Each of these PCM-transmission systems can be assigned individually to a specific traffic direction. However, two or more PCM-transmission systems can also be assigned to one traffic direction, i.e. in terms of switching technology, they form a common bundle of channel pairs.

In the event of a switch-over carried out as aforementioned, the connections hitherto existing via channel pairs of the TDM line L2 are interrupted. However, it can also be provided that if those channels which are seized for communications connections, i.e. for speech connections, are not affected by the occurrence of the fault, the corresponding existing connections remain in existence. This will normally be the case, as a result of the occurrence of the operating disturbance which has given rise to the subsequent switch-over. In a known manner, the participating subscribers receive a corresponding audible signal, such as the engaged tone, whereupon they can re-establish the desired connections. This is also the case for switch-back from stand-by operation to normal operation, for example, when the change-over switches 2d1 to 2d4 return to the rest position. In this case, existing connections are interrupted and can be re-established by the respective subscribers, unless the connections can remain in existence. This is also the case, in the event that, in place of the terminal group LTG1, the terminal group LTG2 changes from normal operation to stand-by operation and vice versa.

If a terminal group such as LTG2, changes in the described manner from the normal operation situation to the stand-by operation situation, all the channel pairs comprised by the transmission systems 1u1 to 2u4 can continue to operate only via the TDM line L1 and its channel pairs. This takes place in the TDM switching device GS1 in a known manner. As a consequence, a substantially higher traffic load occurs on the respective TDM line, for example L1/1, in the switch-over sitiuation (relating to the change-over switches 2d1 to 2d4).

Since, as is known, in terms of numbers it is not possible to switch through connections via the channel pairs of the TDM line L1 at every time at which channel pairs are in fact available. The channel pairs of the transmission systems can be used to only approximately half the traffic load capacity. This means that on average, the channel pairs in each of these transmission systems 1u1 to 2u4 can in part remain unused. However, it is ensured that each of these transmission systems can continue to operate. As a result, connection facilities still exist for each of the respective traffic directions, although these are limited in number. Thus a total breakdown need not occur in either traffic direction if one of the TDM lines L1/1, L1/2, L2/1, L2/2 (or another) breaks down as a result of a fault or disturbance. As is known, the TDM connection lines L1/1, L1/2 and L2/1, L2/2 leading from each of the terminal groups (LTG1, LTG2) to the switching network are duplicated, as is the switching network itself and each terminal group is connected individually via the one and the other TDM line to the one and the other of the two switching networks. When faults occur at a central location, for example in the switching network K1, a switch-over takes place.

In this association, it can also be provided that the stand-by operation situation is evaluated to the effect that half of the channel pairs of each of the transmission systems 1u1 to 1u4 are blocked. The blocked channel pairs are then inaccessible for new seizures for the establishment of new connections for such time as the stand-by operation situation continues. It is also possible to report the stand-by operation situation to those exchanges to which the exchange in question is connected via the relevant transmission systems 1u1 to 2u4. It can be provided that in these other exchanges, the respective transmission systems are marked as partially blocked in respect of the channel pairs contained therein until the stand-by operation comes to an end. This may also influence the path-finding and routing in other exchanges (and likewise in the directly affected exchange), for example, as regards an appropriate change in the path-finding program and/or the currently valid routing rules applied in practice in terms of the path selection.

The connections are established via the central switching network K1. The central processor ZW1 cooperates in this procedure. In the central processor, the terminal groups, the terminals units contained in each of the terminal groups and the channel pairs which lead across these can be driven by means of addresses. It can now be provided that each of the terminal units is driven both by means of a normal operation address and by means of a stand-by operation address by the central processor. Thus the normal operation addresses and stand-by operation addresses can be used as necessary during operation. The terminal units which are connected to PCM transmission systems can each be driven by the central processor by means of a normal operation address and a stand-by operation address and when an operational disturbance occurs in a terminal group, such as LTG2, or the group control device thereof, such as GP2, the stand-by operation addresses of the respective terminal units, such as 2DIU1 to 2DIU4, which are blocked during the normal operation of the latter in the central processor are unblocked and the normal operation addresses of these terminal units are blocked in their place. In a manner which will now be described in detail, the central processor is informed that a terminal group, such as LTG2, is changing from normal operation to stand-by operation. As a result of this message, the central processor undertakes the previously-described process of unblocking the stand-by operation addresses of the respective terminal units and of blocking the normal operation addresses of the terminal units. This also applies in identical fashion to drive addresses of the channel pairs which lead across the relevant terminal units. The terminal units, such as 2DIU1 to 2DIU4, can be driven by the central processor by means of the normal operation address via its assigned terminal group, such as LTG2, directly and by means of the stand-by operation address via the other terminal group, such as LTG1.

In accordance with the aforementioned switch-over of the connection paths (all the channel pairs) by means of the change-over switches 2d1 and 2d4, in the event of a transition from normal operation to stand-by operation, the central clock supply of the respective terminal units is also switched-over from the assigned terminal group to the respective other terminal group. This ensures that the terminal units operate in clock-synchronism with the terminal group to which the switch-over has taken place. In the same way, the supply of the necessary operating voltages for the terminal units in question can also be switched over from the terminal group which has changed from normal operation to stand-by operation to the particular other terminal group. It is even more advantageous to provide that the devices for the operating voltage supply are redundant, i.e. resistant to breakdown, by providing them in duplicate for all the terminal units of the two terminal groups.

Alternatively, the terminal units can be driven by the central processor via the signal channels and assigned to the terminal groups, by means of an address. The address can comprise a first address section, designating the respective terminal group, and a second address section designating the respective terminal unit within the terminal group. The first address section of the address of the respective terminal unit is used to drive that terminal group to which the respective terminal unit belongs. The terminal group is driven such that an item of setting-up information is formed with the assistance of the first address section in the address-signal-converter U11/U12, which is fed via the signal path u1 to the electronic selector W1, whereby the input-output device G1 is connected via the buffer device MB1 to the signal channel which is maintained in the switched-through state via the switching K1 and which leads via TDM line L1/1, to the respective terminal group. Thus the central processor contains an address-signal channel-converter G1 which, when an item of information occurs for a terminal unit, on the basis of the first address section of the address attached to the information emits a signal channel number which is used by the processor to drive the respective signal channel. Thus this signal channel number designates the previously-mentioned signal channel in question. This signal channel number functions as setting-up information which is forwarded via the signal path u1 to the electronic selector W1 in order to set the latter at the respective signal channel. This electronic selector can also represent a coupler of any known design. The address signal channel converter G1 in the central processor SW1 can also be arranged separate from the processor (as shown in FIG. 1), but can also form part thereof. It functions in a known manner to handle the input procedures and output procedures of the central processor ZW1.

As aforementioned, whenever a signal channel is operated in order to drive the respective terminal group, the aforementioned address and the information are transmitted via this signal channel. Address and information are transferred via the signal channel to the respective terminal group and then, via the aforementioned TDM switching device, such as GS1, first to the respective decentral control device, such as GP1. On the basis of the address, and in particular the second address section thereof, the decentral control device recognizes which of the terminal units the respective information is to be transferred to.

The address section described above designates the terminal group to which the address and the information have been transmitted as aforementioned. The second address section now indicates which of the terminal units within the respective terminal group, such as LTG1, is the terminal unit to which the information in question is to be forwarded. It is assumed that this is the terminal unit 1DIU2. It is further assumed that the terminal group in question, such as LTG1, is in the normal operation state. Therefore the change-over switch 1d2 is in the rest position shown in FIG. 2. Consequently in this operating state the terminal unit 1DIU2 is connected via the rest side of the change-over switch 1d2 to the TDM switching device GS1 of the terminal group LTG1.

As already explained, together with the information destined for the terminal unit 1DIU2, the decentral control device GP1 has also received and intermediately stored the address comprised of a first address section designating the terminal group LTG1 and a second address section designating the terminal unit 1DIU2 in this terminal group. On the basis of the first address section the decentral control device GP1 recognizes that the information in question is to be forwarded to a terminal unit assigned to the same terminal group LTG1. On the basis of the second address section the decentral control device GP1 recognizes that the information is to be forwarded to the terminal unit 1DIU2. As a result the decentral control device GP1 controls the TDM switching device GS1 such that a transmission path is switched through from the decentral control device GP1 to the terminal unit 1DIU2 and thus extends via the rest side of the change-over switch 1d2.

Alternatively, it is possible that the decentral control device GP1 does not receive the information together with the respective address, but merely receives the address alone and that on the basis of this address it switches through a direct transmission path for the information from the signal channel extending along the TDM line L1.1, via the TDM switching device GS1 and the rest side of the change-over switch 1d2, to the terminal device 1DIU2. In this case the address is received, via the signal channel, in the decentral control device GP1 where it is used to switch through a direct path from the aforesaid signal channel to the terminal unit in question. Thus intermediate storage of the respective information in the decentral control device GP1 would be unnecessary.

The special stand-by operation situation is similarly described in this context. As already mentioned a stand-by operation situation, linked to a fault or a disturbance, can be caused because the signal channel between a terminal group and a central processor cannot be used or the decentral control device, such as GP2, and/or the TDM switching device, such as GS1, of the respective terminal group does not have the necessary functioning capacity. This can be detected by the central processor by a continuous monitoring procedure described in detail in the aforementioned publication "Telcom Report" and in the German Patent No. OS 3 106 903. If a central processor recognizes an operational disturbance, affecting the terminal group LTG2, the whole of the remainder of the data exchange between the central processor SW1 and the terminal units 2DIU1 to 2DIU4 of the terminal group LTG2, affected by the operational disturbance, takes place via the terminal group LTG1 for the duration of the operational disturbance. For this purpose all the change-over switches in the affected terminal group LTG2 are brought from the rest position into their operating position. This can take place in two ways. Firstly, it can be provided that the operational disturbance is recognized actually in the terminal group which it is affecting. This can occur in that the data exchange with the central processor, which serves to continuously check the full functioning capacity of each of the terminal groups, in accordance with the teachings of German Patent No. OS 3 106 903, no longer takes place and that this is recognized within the affected terminal group. As a result, the aforementioned actuation of the change-over switches 2d1 and 2d4 within the affected terminal group can be carried out by its decentral control device, GP2. Secondly, it can also be provided that the decentral processor SW1 recognizes the operational disturbance affecting the terminal group LTG2 and that it transfers a corresponding item of information to this effect to the decentral control device GP1 of the paired terminal group LTG1 and that the latter then transfers a command to the terminal LTG2 to actuate the aforementioned four change-over switches therein.

Thus in the case of an operational disturbance affecting the terminal group LTG2, the change-over switches 2d1 to 2d4 are actuated. Correspondingly, the terminal units 2DIU1 to 2DIU4 are connected to the TDM switching device GS1 of the terminal group LTG1.

If the central processor ZW1 recognizes the functional disturbance relating to the operational disturbance of the terminal group LTG2, and if it thus recognizes that the continuing data exchange with the corresponding terminal units 2DIU1 to 2DIU4 is to be handled via the signal channel of the terminal group LTG1, it emits a corresponding item of information to the address signal converter U11/U12 in the input-output device G1. As a result of this item of information, the signal channel number relating to the terminal units 2DIU1 to 2DIU4 in the terminal group LTG2 is temporarily changed. In practice this means that for the duration of the operational disturbance of the terminal group LTG2, when one of its terminal units is driven, on receipt of an address comprising a first address section designating the terminal group LTG2 the address signal channel converter supplies the electronic selector W1, via the control path u1, with an item of control information which causes the signal channel of terminal group LTG1, in place of the signal channel of terminal group LTG2 to be driven by the electronic selector W1. Thus in the event of an operational disturbance of the terminal group LTG2, in order to drive a terminal unit 2DIU1 to 2DIU4 the central processor emits the address and information for the respective terminal group in the same way as when the terminal group LTG2 is in the normal operating state. For the duration of the operational disturbance of the terminal group LTG2 it is stored in the address signal channel converter U11/U12 in place of the signal channel of the terminal group LTG2 the signal channel of the terminal group LTG1 is to be driven. The re-routing of the information for the terminal units of the terminal group LTG2, relating to the operational disturbance thereof, is thus carried out in the input/output device with the assistance of the electronic selector W1 on the basis of a temporary change of the signal channel numbers which are stored in the address signal channel converter U11/U12 and which are called up from the address signal channel converter as control information when required and are conducted to the control unit of the selector W1.

If, due to a disturbance, an item of information, together with its assigned address, consisting of a first address section and a second address section, is transmitted to the terminal group LTG1 although the information in question is intended for one of the terminal units 2DIU1 to 2DIU4, the decentral control device GP1 first recognizes from the first address section that the information in question is intended for a terminal unit of the other terminal group. From the second address section, this decentral control device recognizes the respective terminal unit for which the information is intended. On the basis of the first address section and the second address section the decentral control device GP1 forwards the information in question to that terminal unit of the other terminal group LTG2 for which it is intended. For this purpose, via the TDM switching device GS1 the decentral control device GP1 switches through a transmission path over which the information is then transmitted. This takes place via the corresponding terminal of the TDM switching device GS1 and the operating side of the respective change-over switch, such as 2d2. In this case, the respective information can be intermediately stored in the decentral control device GP1 and then transferred from the decentral control device to the respective terminal unit such as 2DIU2 or it can be provided so that a direct path is switched through from the signal channel extending along the TDM line L1/1 to the terminal device 2DIU2 via the TDM switching device GS1 and via the change-over switch 2d2 which is in the operating position.

In the manner just described, it is possible to transmit information from the central processor to each of the terminal units and also in the reverse direction. In the latter case, the information transmitted from the central processor to the respective unit can consist of an item of call-up information as a result of which the called-up information which is to be transferred is then transmitted in the reverse direction from the respective terminal device to the central processor. The transfer of information from terminal group to terminal group can also take place in the same manner, as described in the German Patent No. 3 128 365. Thus items of information can be transferred from a terminal unit of one terminal group to a terminal unit of another terminal group, where these items of information need not be received by the central processor ZW1 itself, but having arrived from a terminal unit in the input-output device G1, are directly transferred to the respective terminal device for which they are intended. This is possible as a result of the routing of the information within the input-output device G1, as described in the U.S. Pat. No. 4,499,461.

Having described in general terms a TDM telephone exchange system in which the present invention is employed, the description of the preferred embodiment of the invention, will now be described.

As already stated, a central switching network K1/K2, which serves to switch through the connections, is provided in duplicate. A central processor ZW1/ZW2 is likewise provided in duplicate, where the first switching network, for example K1, and a first central processor, for example ZW1, are mutually assigned to one another, as are the other switching network and the other central processor. One of the functions of the central processor, known per se, is to control its central switching network and to process switching characteristics for this purpose. Each of the two processors is program-controlled in a known manner. The duplication of the switching network and the central processor serves in a known manner to provide a stand-by operation facility. In the event of a functional disturbance and/or a circuit fault in one of the two switching networks and/or in one of the two central processors and/or in another assembly assigned thereto, the possibility exists, of continuing the switching operation by not using the first central switching network, such as K1, and its central processor ZW1, but rather by using the other of the two switching networks, and such as K2, and the other of the two central processors, such as ZW2, and vice versa.

It has likewise already been described and is also already known that a plurality of decentral terminal groups may each be equipped with a subsidiary switching network for the external connection of connection lines and/or subscriber lines and corresponding channels, and with a decentral, programmable control device which receives switching characteristics from these lines, pre-processes the sWitching characteristics, and transfers them to the respective central processor, and which transmits switching characteristics to the aforesaid lines and channels. Thus, for example, the terminal group LTG1 may include the subsidiary switching network GS1 and the decentral control device GP1. The subsidiary switching network GS1 is externally connected to the devices 1DIU1 to 1DIU4 which have already been described. Internally the subsidiary switching network is connected to the two TDM lines L1/1 and L1/2 which lead to the two central switching networks K1 and K2. Again, as already described, each of these TDM lines comprises a plurality of channel pairs, i.e. thirty, where each channel pair comprises one transmission channel in the one transmission direction and one transmission channel in the other transmission direction. Each of these channel pairs forms a link line. Consequently, each subsidiary switching network, such as GS1, is connected via two groups of link lines, separated in groups, to switching network terminals of the first of the two parallel switching networks and to the other thereof.

It is also known that for a data exchange, for the handling of switching characteristics, between the decentral control devices and the central processor which is ready for operation, data connections are brought into or maintained in the ready-for-operation state. In this handling of switching characteristics items of dialed information emitted by subscribers and switching characteristics which are incoming via connection paths which have already been established or have already been established in part and which arrive via the decentral terminal-groups are fed to the respective central processor following pre-processing in the respective decentral control device, as a result of which the central processor prepares items of setting-up information for its central switching network, together with switching characteristics and items of control information which, for transmission via the respective connections, are returned to the respective decentral control unit where they are transmitted and/or lead to the connection of audible telephone signals, ringing signals and the like for the subscriber in question. The data exchange between each of the decentral control units and the respective central processor, which takes place for the handling of the switching characteristics, is carried out via data connections which are established between each of the decentral control devices, via the switching network currently in operation, and the central processor currently in operation, and which are continuously maintained in the ready-for-operation state. These data connections are established via the central switching network similarly to communications connections. They run via the devices MB1 and G1 provided the switching network K1 and the central processor ZW1 are currently in operation.

The aforementioned data connections between each of the decentral control devices of each of the terminal groups and the central processor currently in operation serve not only for the aforesaid data exchange for the aforesaid handling of the switching characteristics, but also serve to provide that when a central processor, and a central switching network to which it is assigned, commence operation, the central processor transfers program software and switching software to all the decentral control devices of all the terminal groups. This procedure is referred to as "loading" and is described in detail in the aforementioned publication "Telcom Report" 1981 supplement, at page 19 ff. For this purpose, and in the preferred embodiment, an input-output device, such as G1, is provided which is connected to the central processor, such as ZW1, and to which a plurality of data buffer storage devices, such as MB1. A plurality of data connections are connected from each of the data buffer storage devices and lead via the respective switching network, such as K1, to the decentral control devices of the aforesaid terminal groups. These data buffer stores are permanently individually connected by link terminals, similarly to the link lines, to terminals of the switching network. As already described, a link line, and thus also a link terminal, in each case consists of a pair of channels. The channel pairs are assigned to the TDM lines connected to the switching network K1 and K2.

The items of switching information which are required for the switching operation and which are to be stored in the decentral control devices, such as for example subscriber terminal position, subscriber number allocations, subscriber authorizations and technical features of connected connection lines and the like, together with items of program information which govern the handling of the switching functions, are first input into corresponding stores of the two central processors from where, when a central processor commences operation, they are transferred to the decentral control devices of the various terminal groups and stored therein. This transfer and storage takes place individually with respect to each terminal group, i.e. individually in turn for the decentral control devices of the various terminal groups. The time outlay required for this purpose when an exchange is connected is negligible compared to the overall operation of setting up an exchange. However, this time outlay is of greater significance in the case of the stand-by connection of the central processor and central switching network. Here too it is provided that the decentral control devices of the terminal groups be loaded with the items of switching information and program information stored in the central processor in order to ensure total identity between the items of information, which thus are stored in the central processor which is commencing operation and in the decentral control devices. This eliminates any differences, which might otherwise occur with respect to these items of switching information and program information, which thus are stored in the central processor which is commencing operation and in the decentral control devices of each of the various terminal groups. Such differences could arise, for example, when intervening modifications of these items of switching information and/or program information are carried out or when in the decentral control devices these items of information have been altered by disturbing influences of some kind. However, such deviations are safely eliminated by a re-loading of all the decentral control devices with the items of program information and switching information from the central processor which is commencing operation in association with the provided stand-by operation.

In order to reduce the time duration of the described procedure of loading the items of program information and switching information from the central processor, which is commencing operation in association with stand-by operation, into the decentral control devices of the various terminal groups, two terminal groups are assigned to one another in pairs, and each of the said terminal groups terminal units which function for the external connection of subscriber lines and/or connection lines and which, within the respective terminal group, in normal operation are connected to the subsidiary switching network thereof, in the case of stand-by operation can in part be switched-over. Thus use is made of the technical procedure, already described in detail hereinbefore, whereby the described switch-over from normal operation to stand-by operation is prepared for in all the terminal groups. In this way the terminal units of a first of two paired terminal groups is in each case additionally connected to the subsidiary switching network of the respective other, thus second terminal group. This procedure takes place in all the terminal groups assigned to one another in pairs. For the connections running across the switched-over terminal units, the necessary processing of switching characteristics and setting-up of the subsidiary switching networks is likewise carried out by the decentral control device of the respective other, thus second terminal group.

Thus in this operating situation, within two paired terminal groups, the decentral control device of only one of said terminal groups services all the terminal units, such as for example subscriber connection circuits, multiple subscriber connection circuits, connection line terminating circuits, which can also represent connection line multiple terminating circuits and the like. Also in this operating situation all the connections which are established via the terminal units of the two terminal groups are switched through via the subsidiary switching network of only one of the two terminal groups. Assuming that in this operating situation the terminal units of a first of these two terminal groups are additionally connected to the subsidiary switching network of the respective other terminal group, the whole of the connection establishment is carried out via the subsidiary switching network of the second terminal group under the control of its decentral control device. The two terminal groups are entirely equal to one another in terms of rights, i.e. this switch-over can also take place in reverse in respect of the two terminal groups. The whole of the continued operation then temporarily takes place in the manner described in relation to the stand-by operation described in detail in the foregoing. In this operating situation all the terminal groups are involved in stand-by operation.

Following the establishing of the stand-by operation state, half of all the decentral control devices have withdrawn from the switching operation, and likewise half of all the subsidiary switching networks, i.e. one decentral control device and the subsidiary switching network assigned thereto in respect of each pair of terminal groups.

The stand-by substitution of one of the two central processors by the respective other central processor is thus prepared for, while the central processor hitherto in operation initially continues to operate, in that all the terminal groups, assigned to one another in pairs, are changed from normal operation to stand-by operation. In addition, the other central processor establishes data connections via the assigned, other central switching network to the decentral control devices of all the first terminal groups. This is carried out in the manner described in the foregoing. Thus, these connections are established to the decentral control devices of all the terminal groups whose terminal units have been switched over to the subsidiary switching network of the paired other terminal unit, and the terminal groups whose decentral control devices and subsidiary switching networks have been withdrawn from normal switching operation in preparation for the processor stand-by connection.

The central processor which is to commence operation as a result of the imminent stand-by connection notes via the newly-established data links information and switching information into the respective decentral control devices and into the corresponding stores thereof. Thus this central processor successively supplies the respective decentral control devices, currently withdrawn from regular switching operation, with the items of program and switching software required for the recommencement of their operation, in order that they may be stored therein. This is carried out in advance by the central processor which is to commence operation in association with the imminent stand-by connection, during a transition time in which the other central processor is still continuing switching operation with those decentral control devices and subsidiary switching networks which, for this purpose have changed from normal operation to stand-by operation, in order to prepare for the intended processor stand-by connection.

On the completion of the previously-described procedures of loading items of program information and switching information, which serve to prepare for a processor stand-by connection, the actual stand-by connection takes place. Here, in a known manner all the central data processing and control functions are transferred from the one central processor to the other central processor, and at the same time one central switching network is replaced by the other central switching network. Here it can be provided that already existing connections can continue to remain in existence until they are cleared. All new connections are then established by means of the newly-loaded, decentral control device via the assigned subsidiary switching networks. The other decentral control devices and their assigned subsidiary switching networks are no longer used for the establishment of further connections. In this respect a switch-over then takes place within the terminal groups by means of the switch-over contacts 1d1 to 2d4 shown in FIG. 2. The switching operation is thus then continued with the assistance of those decentral control devices which, until the processor stand-by connection took place, were withdrawn from normal switching operation, and via the assigned subsidiary switching networks. Those decentral control devices and assigned subsidiary switching networks which have continued with the switching operation in the quasi-stand-by mode are initially brought out of operation. Then, however, the central processor which is commencing operation as a result of its stand-by connection in turn establishes data connections to all those decentral control devices which have initially been brought out of operation as a result of the stand-by connection. Then the central processor also loads the requisite items of program information and switching information into the stores of these decentral control devices. This procedure is interspersed into the normal switching procedures. When the decentral processor has supplied all the decentral control devices with the necessary items of program information and switching information, a switch-back is made from the stand-by operating mode to the normal operating mode consecutively in the terminal groups assigned to one another in pairs.

What is claimed is:

1. A circuit for a central control PCM telecommunications exchange having a stand-by operating facility, said circuit including:
a duplicate pair of central switching networks each capable of carrying out system operation for the switching of line connections, and a duplicate pair of central processors each associated with and operatively connected to a respective one of said central switching networks for system operation thereof, wherein one central switching network and associated one central processor are used for normal system operation and the other central switching network and associated other central processor are kept in stand-by for backup system operation, and a plurality of decentral terminal groups, each one of which is connected in parallel to the two central switching networks by respective link lines, and each one of which includes a plurality of terminal units, a subsidiary switching network associated with the terminal units for connecting them to the central switching networks via the respective link lines, and a programmable, decentral control device associated with the subsidiary switching network which is capable of receiving, processing and/or transmitting switching information to and from the central processors via the respective link lines and the respective central switching networks, wherein the decentral control device of each of said plurality of decentral terminal groups is loaded with program software and switching software from a central processor for initializing system operation with the central processor and associated central switching network, wherein the improvement comprises:

said plurality of decentral terminal groups being assigned to each other in pairs and having switching lines connected between the decentral terminal groups of each assigned pair, said subsidiary switching network of each decentral terminal group being capable of connecting the terminal units of the other decentral terminal group of its assigned pair, as well as its associated terminal units, to one central switching network via a respective link line, in a stand-by mode during a changeover of system operation from the one central switching network and associated one central processor to the other central switching network and associated other central processor, and each decentral terminal group having a plurality of changeover switches which are switchable between a normal position, for respectively connecting its terminal units to its associated subsidiary switching network in normal operation, and a stand-by position, for respectively connecting its terminal units to the subsidiary switching network of the other decentral terminal group of its assigned pair via said switching lines in stand-by operation during a changeover of system operation, wherein a changeover of system operation is carried out without a substantial interruption of the switching functions of the decentral terminal groups by switching the terminal units of one decentral terminal group of each assigned pair, via the changeover switches in the stand-by position, for connection to the subsidiary switching network of the other decentral terminal group of each assgned pair while the one central processor continues in system operation, so as to remove the subsidiary switching network and associated decentral control device of said one decentral terminal group of each assigned pair from operation temporarily so that switching software and program software can be loaded to said decentral control device removed from operation from the other central processor kept in stand-by, and then switching back the terminal units of said one decentral control group to its associated subsidiary switching network, via the changeover switches in the normal position, when the loading of switching software and program software to said decentral control device removed from operation has been completed.

2. A circuit as claimed in claim 1, wherein the terminal groups of said one decentral terminal group of each assigned pair are switched from normal operation to stand-by operation by said other central processor which is in standby during the changeover operation.

3. A circuit as claimed in claim 1, wherein upon switching back the terminal units of said one decentral control group of each assigned pair to its associated subsidiary switching network, the terminal units of the other decentral control group of each assigned pair are switched in stand-by operation to the subsidiary switching network of said one decentral terminal group, and said other central processor is placed in system operation and said one central processor is taken out of system operation and placed in stand-by, whereby the subsidiary switching network and associated decentral control device of the other decentral terminal group of each assigned pair are removed from operation temporarily so that switching software and program software can be loaded to said decentral control device removed from operation from said one central processor which is taken out of system operation, and the terminal units of the other decentral control group of each assigned pair are then switched back to its associated subsidiary switching network, via the changeover switches in the normal position, when the loading of switching software and program software to said decentral control device of the other decentral control group has been completed and said other central processor continues in system operation.

4. A circuit as claimed in claim 1, wherein each decentral terminal group is a line trunk group which comprises digital interface units as said terminal units, a group switch as said subsidiary switching network, and a group processor as said decentral control device.

* * * * *